Patented Mar. 24, 1942

2,277,230

UNITED STATES PATENT OFFICE 2,277,230

AZO DYESTUFFS

Ernst Heinrich, Frankfort-on-the-Main-Fechenheim, Germany, assignor to General Aniline & Film Corporation, a corporation of Delaware No Drawing. Application October 25, 1939, Serial No. 301,153. In Germany November 4, 1938

4 Claims. (Cl. 260—205)

My present invention relates to new azodyestuffs, more particularly to those of the general formula:

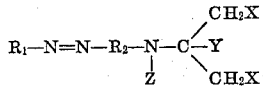

in which formula $R_1$ and $R_2$ stand for radicles of the benzene series not containing a water solubilizing group, Z for a member of the group consisting of hydrogen, alkyl,, hydroxyalkyl and cyanalkyl, X for a member of the group consisting of hydrogen and methyl, Y for a member of the group consisting of CN, $CONH_2$ and $COOR_3$, $R_3$ standing for a member of the group consisting of alkyl and hydroxyalkyl, which dyestuffs dye cellulose esters and ethers, particularly acetate artificial silk mostly bright shades of a remarkable fastness, particularly to light.

The new dyestuffs are obtained by combining diazocompounds not containing a water solubilizing group with coupling components of the formula

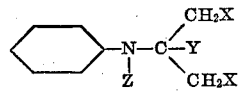

wherein X, Y and Z have the aforesaid signification.

In order to further illustrate my invention the following examples are given, the parts being by weight and all temperatures in degrees centigrade.

Example 1

138 parts of 3-nitro-1-aminobenzene are diazotized and the diazo-solution thus obtained is combined with 160 parts of α-phenylamino-iso-butyric acid nitrile suspended in about 250 parts of concentrated hydrochloric acid and 2000 parts of water, with the addition of a sufficient quantity of sodium acetate so that the solution no longer has a mineral acid reaction. The combination is finished in a short time. The azodyestuff formed dyes acetate silk reddish yellow shades particularly fast to light and corresponds with the formula:

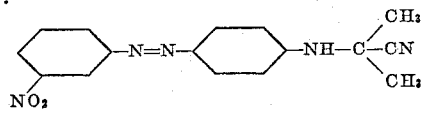

When using as coupling component 180 parts of α-phenylamino-iso-butyric acid amide a dyestuff dyeing acetate silk likewise similar fast shades is obtained.

Example 2

The diazocompound of 138 parts of 4-nitro-1-amino-benzene is combined with 160 parts of α-phenylamino-iso-butyric acid nitrile, advantageously suspended in about 250 parts of concentrated hydrochloric acid and about 2000 parts of water. The combination begins immediately and is finished after the addition of sodium acetate. The formed dyestuff of the formula:

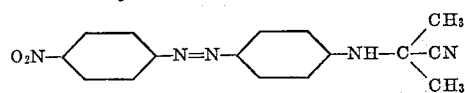

is isolated. It dyes acetate silk clear yellowish orange shades of a good fastness to light.

When using as coupling component 174 parts of α-phenylamino-α-ethyl-propionic acid nitrile or 188 parts of α-phenylamino-α-ethyl-n-butyric acid nitrile the formed dyestuffs of the formulae:

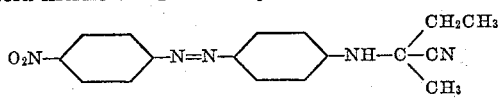

and

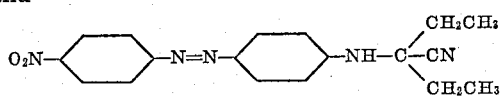

respectively dye acetate silk similar shades of a likewise good fastness to light, whereas the dyestuffs of the formulae:

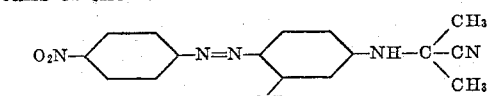

and

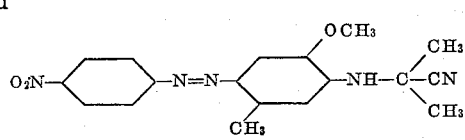

respectively formed while using as coupling component 174 parts of α-(3-methylphenylamino)-isobutyric acid nitrile and 204 parts of the corresponding α - (2 - methoxy - 5 - methylphenyl)-amino-compound respectively dye acetate silk clear reddish orange shades of a good fastness to light.

Example 3

The diazosolution obtained by diazotizing 172 parts of 2-chloro-4-nitro-1-aminobenzene is combined with 200 parts of α-phenylamino-isobutyric acid methylester dissolved in about 250 parts of concentrated hydrochloric acid and about 2000 parts of water. The combination begins immediately and is finished after the addition of sodium acetate. The formed dyestuff of the formula:

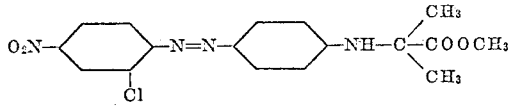

dyes acetate silk clear reddish orange shades of a good fastness to light.

When using as coupling component 180 parts of α-phenyl-amino-iso-butyric acid amide or 174 parts of α-(3-methyl-phenyl-amino)-isobutyric acid nitrile or 188 parts of α-phenylamino-α-ethyl-butyric acid nitrile or 223 parts of α-phenylamino-iso-butyric acid glycolester the formed dyestuffs of the formulae:

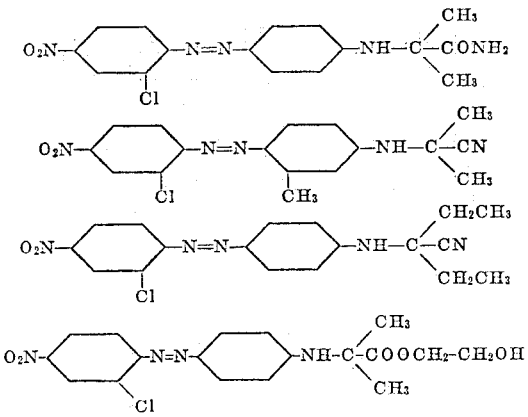

respectively dye acetate silk likewise reddish orange shades of good fastness properties.

Example 4

The diazo compound of 138 parts of 3-nitro-1-amino-benzene is combined with 204 parts of N - oxethyl-N-phenyl - α - amino-isobutyric acid nitrile, which has been dissolved in about 250 parts of concentrated hydrochloric acid and 2000 parts of water. The combination is carried out in the presence of such an amount of sodium acetate that the solution no longer has a mineral acid reaction, and is complete in a short time. The dyestuff thus obtained of the formula:

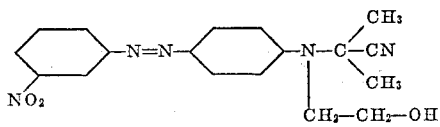

dyes acetate artificial silk reddish yellow shades of a good fastness to light.

When using as coupling component 218 parts of N - oxethyl-N-(3-methylphenyl) - α - amino-isobutyric acid nitrile the formed dyestuff dyes acetate silk somewhat more reddish yellow shades.

The dyestuff, obtained while using as coupling component 213 parts of N-(β-cyanethyl)-N-phenyl-α-aminoiso-butyric acid nitrile, of the formula:

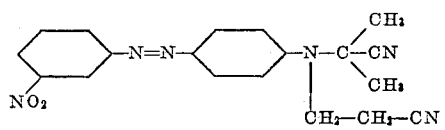

dyes acetate silk clear reddish yellow shades.

Example 5

The diazosolution obtained by diazotizing 138 parts of 4-nitro-1-aminobenzene is combined with 218 parts of N-oxethyl-N-(3-methylphenyl)-α-amino-isobutyric acid nitrile, dissolved in about 250 parts of concentrated hydrochloric acid and about 2000 parts of water. The combination begins immediately and is finished after the addition of sodium acetate. The formed dyestuff of the formula:

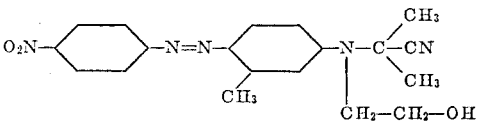

is isolated. It dyes acetate silk clear yellowish red shades of good fastness to light.

When using as coupling component 204 parts of N-oxethyl-N-phenyl-α-amino-isobutyric acid nitrile a dyestuff is obtained which dyes acetate silk clear reddish orange shades.

While using as coupling component 202 parts of N-ethyl-N-(3-methylphenyl)-α-amino-isobutyric acid nitrile or 202 parts of N-methyl-N-(2.5-dimethyl-phenyl)-α-isobutyric acid nitrile the formed dyestuffs dye acetate silk somewhat more reddish orange shades.

Example 6

The diazosolution obtained by diazotizing 172 parts of 2-chloro-4-nitro-1-aminobenzene is combined with 218 parts of N-oxethyl-N-(3-methyl-phenyl)-α-amino-isobutyric acid nitrile dissolved in about 250 parts of concentrated hydrochloric acid and about 2000 parts of water. The combination begins immediately and is finished after the addition of sodium acetate. The formed dyestuff dyes acetate silk clear bluish red shades of good fastness to light.

While using as coupling component 204 parts of N-oxethyl-N-phenyl-α-amino-isobutyric acid nitrile the formed dyestuff dyes acetate silk clear yellowish red shades whereas the application as coupling component of 227 parts of N-(β-cyanethyl)-N-(3-methylphenyl)-α-amino-isobutyric acid nitrile or 221 parts of N-ethyl-N-phenyl-amino-isobutyric acid methyl-ester or 251 parts of the corresponding glycolester of the formula:

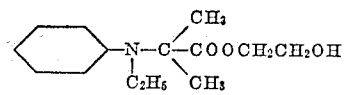

or of 192 parts of N-methyl-N-phenyl-α-amino isobutyric acid amide yields dyestuffs dyeing acetate silk reddish orange shades.

Example 7

The dyestuff obtained by combining the diazo compound of 161 parts of 2.5-dichloro-1-aminobenzene with 204 parts of N-oxethyl-N-phenyl-α-amino-isobutyric acid nitrile dyes acetate silk reddish yellow shades of good fastness properties.

Similar dyestuffs are obtained when using as coupling component 218 parts of N-oxethyl-N-(3-methylphenyl)-α-amino-isobutyric acid nitrile or as diazocomponent the diazocompound of 161 parts of 2.4-dichloro-1-aminobenzene.

Example 8

The dyestuff of the formula:

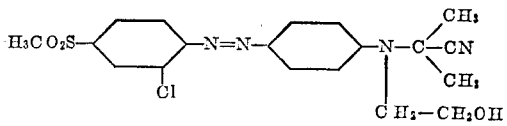

obtained by combining the diazocompound of 205 parts of 1-amino-2-chlorobenzene-4-methylsulfone with 204 parts of N-oxethyl-N-phenyl-α-amino-isobutyric acid nitrile dyes acetate silk clear reddish orange shades of good fastness to light.

While using as coupling component 218 parts of N-oxethyl-N-(3-methylphenyl)-α-amino isobutyric acid nitrile the formed dyestuff dyes acetate silk somewhat more reddish orange shades, whereas the application of 251 parts of N-ethyl-N-phenyl-α-aminoisobutyric acid glycolester of the formula:

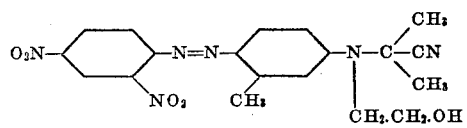

yields a dyestuff dyeing acetate silk clear yellowish orange shades.

*Example 9*

The dyestuff of the formula:

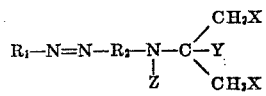

obtained by combining the diazocompound of 183 parts of 2.4-dinitro-1-amino-benzene with 218 parts of N-oxethyl-N-(3-methylphenyl)-α-amino-isobutyric acid nitrile dyes acetate silk clear reddish violet shades of good fastness properties.

I claim:

1. Azodyestuff of the general formula:

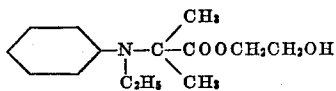

in which formula $R_1$ and $R_2$ stand for radicals of the benzene series not containing a water solubilizing group, Z for a member of the group consisting of hydrogen, alkyl, hydroxyalkyl and cyanalkyl, X for a member of the group consisting of hydrogen and methyl, Y for a member of the group consisting of CN, $CONH_2$ and $COOR_3$, $R_3$ standing for a member of the group consisting of alkyl and hydroxyalkyl, which dyestuffs dye cellulose esters and ethers, particularly acetate silk mostly bright shades of a remarkable fastness, particularly to light.

2. The azodyestuff of the formula:

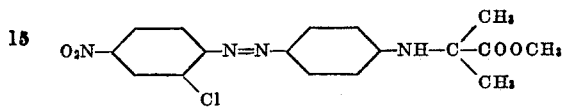

which dyestuff dyes acetate silk clear reddish orange shades of a good fastness to light.

3. The azodyestuff of the formula:

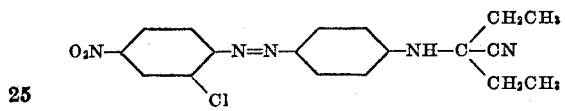

which dyestuff dyes acetate silk reddish orange shades of good fastness properties.

4. The azodyestuff of the formula:

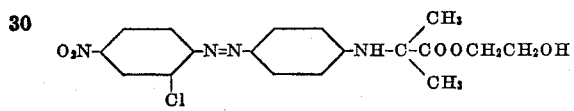

which dyestuff dyes acetate silk reddish orange shades of good fastness properties.

ERNST HEINRICH.